(12) United States Patent
Vrana

(10) Patent No.: US 6,912,776 B2
(45) Date of Patent: Jul. 5, 2005

(54) PIERCE NUT INSTALLATION APPARATUS

(75) Inventor: John J. Vrana, Rochester Hills, MI (US)

(73) Assignee: FabriSteel Products, Inc., Taylor, MI (US)

( * ) Notice: Subject to any disclaimer, the term of this patent is extended or adjusted under 35 U.S.C. 154(b) by 37 days.

(21) Appl. No.: 10/602,660

(22) Filed: Jun. 24, 2003

(65) Prior Publication Data

US 2004/0261258 A1 Dec. 30, 2004

(51) Int. Cl.[7] ................................................. B23P 19/00
(52) U.S. Cl. ............................ 29/798; 29/818; 29/432; 29/505
(58) Field of Search .......................... 411/179; 29/798, 29/818, 432, 505, 809, 281.6, 283.5; 227/10, 52, 77, 139, 150

(56) References Cited

U.S. PATENT DOCUMENTS

| | | | |
|---|---|---|---|
| 3,089,360 A | 5/1963 | Steward | 78/46 |
| 3,098,576 A | 7/1963 | Steward | 218/2 |
| 3,108,368 A | 10/1963 | Steward | 29/432 |
| 3,253,631 A * | 5/1966 | Reusser | 411/179 |
| 3,276,499 A * | 10/1966 | Reusser | 411/179 |
| 3,602,974 A | 9/1971 | Koett | |
| 3,670,610 A * | 6/1972 | Cady, Jr. | 83/55 |
| 3,724,738 A * | 4/1973 | Hurst | 29/243.519 |
| 3,740,818 A * | 6/1973 | Grube | 29/798 |
| 3,810,290 A | 5/1974 | Grube | 29/208 |
| 3,811,171 A | 5/1974 | Grube | 29/208 |
| 3,845,860 A | 11/1974 | Ladouceur et al. | 206/338 |
| 3,877,133 A | 4/1975 | Grube | 29/417 |
| 3,927,452 A | 12/1975 | Pouch et al. | 29/200 |
| 3,942,235 A | 3/1976 | Goodsmith et al. | 29/208 |
| 3,946,478 A | 3/1976 | Goodsmith et al. | 29/208 |
| 3,946,479 A | 3/1976 | Goodsmith et al. | 29/208 |

(Continued)

FOREIGN PATENT DOCUMENTS

| | | | |
|---|---|---|---|
| GB | 964492 | 7/1964 | |
| JP | 62050021 A * | 3/1987 | B21D/39/00 |

OTHER PUBLICATIONS

PCT/US2004/013838 International Search Report.

*Primary Examiner*—Essama Omgba
(74) *Attorney, Agent, or Firm*—Howard & Howard

(57) ABSTRACT

A pierce nut installation apparatus having a feed passage, a plunger passage and a plunger which reciprocates through the plunger passage to engage and install a pierce nut in a panel opposite the plunger passage, wherein the end of the plunger passage includes a nut guide element projecting from the end of the plunger including a frustoconical outer surface having a major diameter adjacent the end face of the plunger substantially equal to the crest diameter of the pierce nut bore which accurately locates the pierce nut on a panel and prevents cocking of the pierce nut in the plunger passage.

17 Claims, 1 Drawing Sheet

U.S. PATENT DOCUMENTS

| | | | | |
|---|---|---|---|---|
| 3,961,408 A | | 6/1976 | Goodsmith et al. | 29/208 |
| 4,018,257 A | * | 4/1977 | Jack | 411/181 |
| 4,153,989 A | | 5/1979 | Shinjo | 29/706 |
| 4,203,187 A | | 5/1980 | Grube | 29/283.5 |
| 4,389,766 A | * | 6/1983 | Capuano | 29/432.2 |
| RE31,535 E | | 3/1984 | Schleicher | 29/432.2 |
| 4,454,650 A | | 6/1984 | Silver | 29/818 |
| 4,564,986 A | | 1/1986 | Peterson | 29/33 |
| 4,574,453 A | | 3/1986 | Sawdon | 29/432 |
| 4,610,072 A | * | 9/1986 | Muller | 29/512 |
| 4,698,905 A | | 10/1987 | Taga | 29/798 |
| 4,757,609 A | | 7/1988 | Sawdon | 29/798 |
| 4,785,529 A | | 11/1988 | Pamer et al. | 29/707 |
| 4,893,394 A | | 1/1990 | Muller | 29/243.52 |
| 5,072,518 A | | 12/1991 | Scott | |
| 5,177,861 A | | 1/1993 | Sawdon | 29/798 |
| 5,208,974 A | | 5/1993 | Sawdon et al. | 29/798 |
| 5,237,733 A | * | 8/1993 | Ladouceur et al. | 29/432.2 |
| 5,339,509 A | | 8/1994 | Sawdon et al. | 29/432 |
| 5,357,663 A | | 10/1994 | Morioka et al. | 29/34 |
| 5,432,989 A | * | 7/1995 | Turek | 29/243.5 |
| 5,564,873 A | * | 10/1996 | Ladouceur et al. | 411/180 |
| 5,636,426 A | | 6/1997 | Luckhardt et al. | 29/432 |
| 5,722,139 A | * | 3/1998 | Ladouceur et al. | 29/34 R |
| 5,743,003 A | | 4/1998 | Shinjo | 29/798 |
| 5,884,386 A | * | 3/1999 | Blacket et al. | 29/522.1 |
| 5,953,813 A | | 9/1999 | Sickels et al. | 29/798 |
| 6,018,863 A | | 2/2000 | Altrock | 29/716 |
| 6,263,561 B1 | | 7/2001 | Sickels et al. | 29/798 |
| 6,295,710 B1 | | 10/2001 | Roberts et al. | 29/407.01 |
| 6,631,827 B2 | | 10/2003 | Goodsmith et al. | 221/238 |
| 2001/0011039 A1 | | 8/2001 | Shinjo | |

* cited by examiner

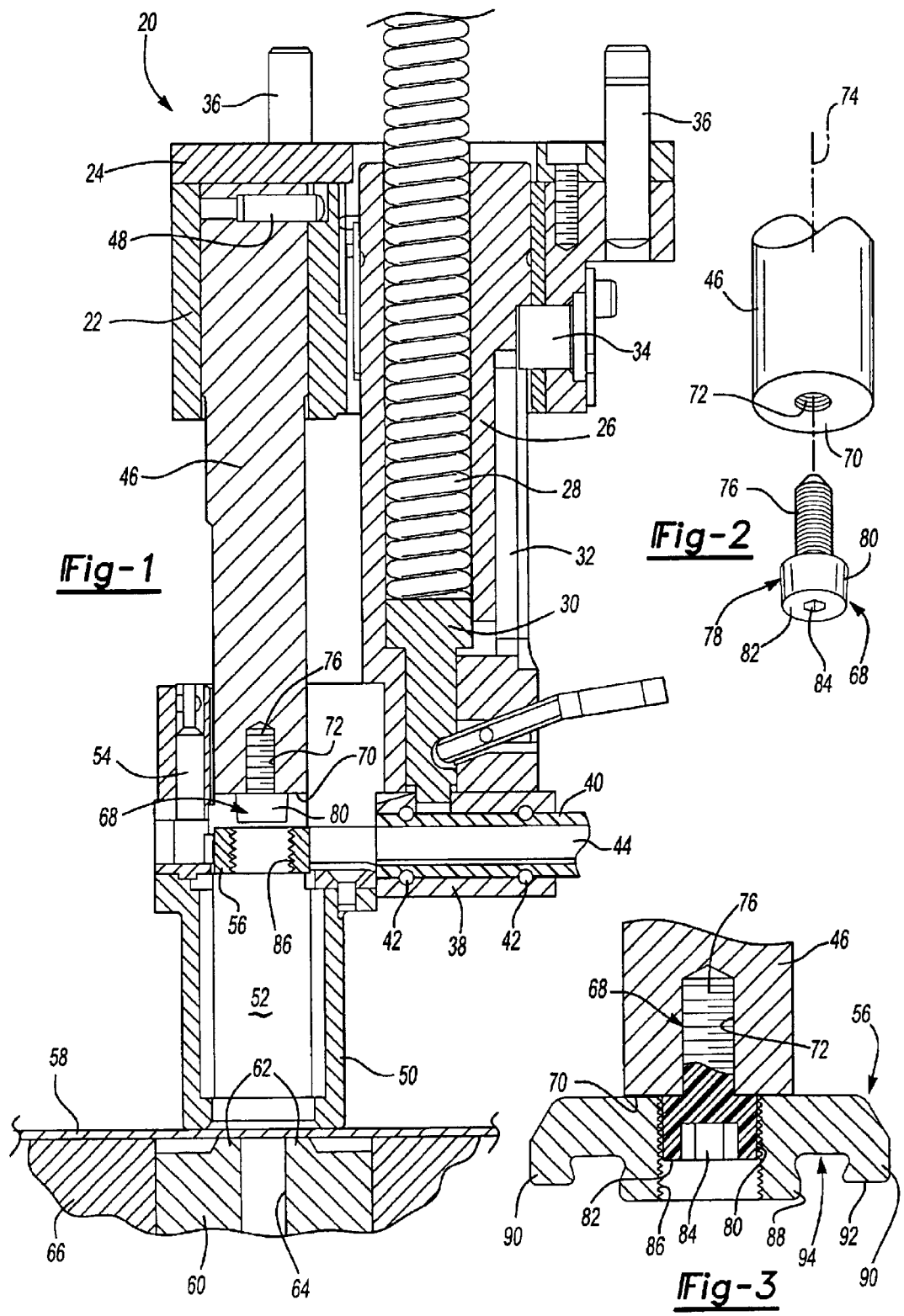

PIERCE NUT INSTALLATION APPARATUS

FIELD OF THE INVENTION

This invention relates to a pierce nut installation apparatus which more accurately locates a pierce nut in a panel and prevents cocking of the pierce nut in the plunger passage.

BACKGROUND OF THE INVENTION

Pierce nuts were invented and commercially developed by the predecessor in interest of the assignee of this application primarily for mass production applications for the automotive and appliance industries. As will be understood by those skilled in this art, a pierce nut includes a projecting pilot portion which punches an opening in a panel and the pierce nut is then installed in the pierced opening by a die member or die button. In a typical application, one die member or die platen, typically the upper die member, includes a pierce nut installation apparatus or head having a reciprocating plunger and the opposed die member includes a die button opposite the plunger of the installation head. A pierce nut is installed in a panel supported on the die button with each stroke of the die press. There are various types of pierce nuts available from the assignee of this application generally including a central projecting pilot portion which pierces or punches an opening in the panel, a bore through the pilot portion which is generally threaded, flange portions on at least opposed sides of the pilot portion and panel receiving grooves located either in the pilot portion or the end face of the flange portion. Pierce nuts may be formed in a rolling process or by cold heading.

A conventional pierce nut installation apparatus or installation head includes a pierce nut feed passage receiving pierce nuts for installation by the installation apparatus, a plunger passage communicating with the feed passage receiving pierce nuts from the plunger passage and a plunger reciprocating through the plunger passage generally having a planar end face which engages a pierce nut received in the plunger passage and drives the pierce nut through the plunger passage against a metal panel located opposite the plunger passage on a die button as described above.

There are two problems associated with the installation of pierce nuts utilizing a conventional pierce nut installation apparatus which is addressed by the pierce nut installation apparatus of this invention. One problem is accurately locating a pierce nut in a panel. As will be understood by those skilled in this art, several pierce nuts may be simultaneously installed in a panel with each stroke of the die press and a second element may be attached to the panel with bolts or the like utilizing more than one pierce nut, requiring very accurate placement of the pierce nuts in the panel. At present, the datums for alignment are measured between the circumference of the thread cylinders of the pierce nuts, requiring several datums for each pierce nut installation. It would be desirable, however, to measure the datums between the axes of the bores of the pierce nuts, significantly reducing the datums, but no method or apparatus has yet been developed which permits measurement of the datums between the axes of the pierce nut bores. As mass production methods become more sophisticated, this has become a more serious problem.

Another problem associated with pierce nut installation apparatus is cocking of the pierce nut in the plunger passage. This problem may be reduced by the use of fingers which receive the pierce nuts and travel with the pierce nuts to the panel during installation of the pierce nuts by the plunger.

The pierce nut installation apparatus of this invention eliminates the problems of accurately locating the pierce nuts installed in a panel, significantly reducing the required number of datums, and substantially eliminates cocking of the pierce nuts in the plunger passage.

SUMMARY OF THE INVENTION

The pierce nut installation apparatus of this invention includes a feed passage receiving conventional pierce nuts of the types described above, a plunger passage communicating with the feed passage and receiving pierce nuts from the feed passage and a plunger reciprocating through the plunger passage having an end portion which is driven against a pierce nut received in the plunger passage for installation in a panel opposite the plunger passage as described above. The end portion of the plunger of the pierce nut installation apparatus of this invention further includes a generally cylindrical portion projecting from the end portion of the plunger configured to be received in the bore of the pierce nut having an outer diameter substantially equal to an internal diameter of the bore, preventing cocking of the pierce nut in the plunger passage and accurately locating the pierce nut on a panel following installation. Because the plunger may be very accurately aligned in the die press and the generally cylindrical projection is accurately aligned with the pierce nut bores, the number of required datums is significantly reduced, permitting the use of the axis of the nut bores of the pierce nuts attached to the panel as the datum for alignment. Further, because the generally cylindrical projection is closely received in the nut bore, cocking of the pierce nuts in the plunger passage is substantially eliminated.

In a preferred embodiment of the pierce nut installation head of this invention, the generally cylindrical projection on the end of the plunger is removable and replaceable to accommodate pierce nuts having different nut bores and replacement. In the disclosed embodiment of the pierce nut installation apparatus of this invention, the generally cylindrical projection is threadably attached to the end portion of the plunger, permitting quick and easy removal and replacement. In the disclosed embodiment, the end portion of the plunger is planar and includes a threaded axial opening and the generally cylindrical portion includes a male threaded end threaded into the threaded axial opening in the end of the plunger.

In a preferred embodiment, the generally cylindrical portion is formed of a material which is softer than the pierce nut, such as a hard polymer and the generally cylindrical projection is frustoconical having a major diameter adjacent the end portion of the plunger having a diameter equal to or slightly greater than the crest diameter of the pierce nut bore providing very accurate alignment of the pierce nut installed on a panel and preventing cocking of the pierce nut in the plunger bore as described above.

Other advantages and meritorious features of the pierce nut installation head of this invention will be more fully understood from the following description of the preferred embodiments, the appended claims and the drawings, a brief description of which follows.

BRIEF DESCRIPTION OF THE DRAWINGS

FIG. 1 is a side cross-sectional view of one embodiment of the pierce nut installation head of this invention;

FIG. 2 is a partial exploded view of the end of the plunger shown in FIG. 1; and FIG. 3 is a side partially cross-sectioned view of the plunger assembly engaging a pierce nut during the installation of a pierce nut in a panel.

DESCRIPTION OF THE PREFERRED EMBODIMENTS

The pierce nut installation apparatus or installation head 20 shown in FIG. 1 may be attached to a die member of a die press to receive and install pierce nuts in a panel as described above, wherein the pierce nut installation head is typically attached to the upper die shoe by a base member 22 generally including a back-up plate 24. The disclosed embodiment of the installation head assembly includes a shank 26 which receives a coil shank spring 28 which is compressed between a retainer bolt 30 and the upper die shoe (not shown). Alternatively, the spring 28 may be replaced with pneumatic pressure. The shank includes a vertical slot 32 which receives shank stop pin 34 during installation of a pierce nut as described below. The back-up plate 24 is aligned on the upper die shoe (not shown) by dowel pins 36 providing accurate alignment of the installation head 20 on the die shoe.

The shank 26 includes a chuting shoe 38 which receives a plastic chute 40 retained by dowel pins 42 which defines a feed passage 44 for receipt of pierce nuts by the installation head 20. The base member 22 further includes a plunger 46 which is retained to the base member by a dowel pin 48. The plunger reciprocates through a nose assembly 50 which defines a plunger passage 52. The disclosed embodiment of the pierce nut installation head 20 further includes a proximity probe 54 which confirms receipt of a pierce nut 56 from the feed passage 44 to the plunger passage 52 opposite the end of the plunger 46 as shown in FIG. 1. As will be understood by those skilled in this art, the pierce nuts 56 may be interconnected by frangible wires or fed to the pierce nut installation head in bulk. For simplicity, only one pierce nut is shown in the plunger passage 52 in FIG. 1. However, during normal operation of the pierce nut installation head, a plurality of pierce nuts 56 will be aligned in the feed passage 44 and a chuck assembly (not shown) feeds the pierce nuts from the feed passage 44 to the plunger passage 52.

During installation of a pierce nut 56 in a metal panel 58, the panel 58 is supported on a die button 60 having clinching lips 62 and an opening 64 which receives the panel slug as will be understood by those skilled in the art. The die button 60 is typically received in the lower die shoe 66 of a die press (not shown) and the base member 22 of the pierce nut installation head 20 is secured to the upper die shoe (not shown). Upon closing of the die press, the nose assembly 50 first engages the panel 58, arresting movement of the nose assembly 50. Continued closing of the die press, drives the end portion of the plunger 46 against a pierce nut 56 in the plunger passage 52, driving the pierce nut against the panel 58, piercing the panel and installing the pierce nut in the panel as is well known in this art. However, as set forth above, there are two problems associated with a pierce nut installation head of this general type which are addressed by the pierce nut installation head 20 of this invention, including (1) accurate alignment of the pierce nut 56 in a panel 58, and (2) preventing cocking of the pierce nut 56 in the plunger passage 52. These objects are achieved by the nut guide element 68 projecting from the end face 70 of the plunger 46 best shown in FIG. 2. In a preferred embodiment, the nut guide element 68 is releasably attached to the plunger 46 such that the nut guide element may be replaced when worn or during installation of a pierce nut having a different size thread cylinder.

In the disclosed embodiment, the end face 70 of the plunger 46 includes a threaded axial bore 72 aligned with the longitudinal axis 74 of the plunger 46 and the nut guide element 68 includes a male threaded end portion 76 which is threadably received in the threaded bore 72 as shown in FIG. 3. The nut guide element 68 further includes a generally cylindrical head portion 78 which projects from the planar end face 70 of the plunger 46 when the male threaded end portion 76 is threaded into the threaded bore 72 as shown in FIG. 3. In a preferred embodiment, the generally cylindrical head portion 78 is frustoconical, as shown in FIGS. 2 and 3, wherein the frustoconical outer surface 80 is tapered at an angle of between two and ten degrees, more preferably between three and seven degrees, having a major diameter at the planar end face 70 of the plunger 46. The circular end face 82 of the nut guide head 78 may also have an Allen wrench opening 84 to permit easy removal and replacement of the nut guide element 68. Alternatively, external wrench flats may be provided for removal. In the preferred embodiment, the nut guide element 68 is formed of a material which is softer than the pierce nut 56, such as a non-ferrous metal, including brass or low carbon steel, but most preferably a polymer, such as nylon, wherein the major diameter of the frustoconical outer surface 80 of the head portion 78 is equal to or slightly greater than the minor or crest diameter of the threaded bore 86 of the pierce nut 56 as best illustrated in FIG. 3.

As set forth above, the pierce nut installation head 20 of this invention may be used for installing any conventional pierce nut, such as the pierce nut 56 shown in FIG. 3. The pierce nut 56 includes a projecting pilot portion 88, flange portions 90 on opposed sides of the pilot portion having end faces 92 and re-entrant or dovetail-shaped grooves 94 in the end faces 92 of the flange portions 90. As is well known in this art, the pilot portion 88 pierces an opening in the panel 58 when the pierce nut 56 is driven against the panel by the plunger 46 and the clinching lip 62 then deform the panel metal into the nut grooves 94.

The method of installing a pierce nut, such as the pierce nut 56 illustrated in FIG. 3, may now be described, as follows. First, pierce nuts are received through the feed passage 44 into the plunger passage 52 opposite the plunger 46 as shown in FIG. 1. The nut guide element 68 is then located opposite the threaded bore 86 of the pierce nut 56. Upon closing of the die press (not shown) as described above, the nose assembly 50 first engages the panel 58 and the planar end face 70 of the plunger 46 is then driven against the pierce nut 56 and the nut guide element 68 is simultaneously received in the nut bore 86. The frustoconical outer surface 80 accurately guides the nut guide element 68 into the bore as shown in FIG. 3 and the nut bore 86 is then accurately aligned with the longitudinal axis 74 of the plunger, resulting in accurate alignment of the pierce nut 56 on the panel 58 following installation, eliminating the requirement for a plurality of datums and permitting the use of one datum aligned with the longitudinal axis of the nut bore 86 which is coincident with the axis 74 of the plunger 46. Finally, the nut guide element 68 also prevents cocking of the nut in the plunger passage 52 because the nut is accurately guided by the nut guide element 78 through the plunger passage 52.

As will be understood by those skilled in this art, various modifications may be made to the pierce nut installation apparatus or head of this invention within the purview of the appended claims. As set forth above, the pierce nut installation apparatus of this invention may be utilized with any pierce nut apparatus having a feed passage receiving pierce nuts for installation by the apparatus, a plunger passage communicating with the feed passage receiving pierce nuts from the feed passage and a plunger reciprocating through the plunger passage and is therefore not limited to the disclosed embodiment. Although the nut guide element is preferably releasably attached to the plunger, the nut guide element may be attached to the plunger by any suitable connector or may be integral with the plunger. Further, as set forth above, the nut guide element may be formed of any suitable material, including a non-ferrous metal, but in a preferred embodiment, the nut guide element is formed of a hard polymer. Further, the pierce nut installation apparatus of this invention may be utilized to install any pierce or clinch nut and is not limited to the illustrated pierce nut. Finally, in a preferred embodiment of the pierce nut installation apparatus of this invention, the longitudinal length of the head portion 78 of the nut guide element is less than the longitudinal length of the nut bore as shown in FIG. 3. However, the head portion 78 of the nut guide element may also have a longitudinal length approximately equal to, but preferably less than, the longitudinal length of the threaded bore of the pierce nut. Having described a preferred embodiment of the pierce nut installation apparatus of this invention, the invention is now claimed as follows.

What is claimed is:

1. A pierce nut installation apparatus, comprising:
    a pierce nut feed passage receiving pierce nuts each having a bore therethrough for installation by said pierce nut installation apparatus in a panel;
    a plunger passage communicating with said feed passage receiving said pierce nuts from said feed passage; and
    a plunger reciprocating through said plunger passage having an end portion engaging and installing said pierce nuts in a panel opposite said plunger passage, said end portion of said plunger including a guide portion axially projecting from said end portion of said plunger received in said bore of said pierce nuts having a frustoconical outer surface tapered inwardly from said end portion at an angle of between three and seven degrees, including a major diameter substantially equal to an internal diameter of said bore of said pierce nuts preventing cocking of said pierce nuts in said plunger passage and accurately locating a pierce nut on said panel.

2. The pierce nut installation apparatus as defined in claim 1, wherein said guide portion is removably attached to said end portion of said plunger.

3. The pierce nut installation apparatus as defined in claim 2, wherein said guide portion is threadably attached to said end portion of said plunger.

4. The pierce nut installation apparatus as defined in claim 1, wherein said end portion of said plunger is planar and includes a threaded axial opening and said guide portion including a male threaded end portion threadably received in said threaded axial opening.

5. The pierce nut installation apparatus as defined in claim 1, wherein said guide portion is formed of a hard polymer.

6. The pierce nut installation apparatus as defined in claim 5, wherein said is frustoconical outer surface has a major diameter at said end portion of said plunger greater than said internal diameter of said bore of said pierce nuts.

7. The pierce nut installation apparatus as defined in claim 6, wherein said frustoconical guide portion has an axial length less than an axial length of said bore of said pierce nuts.

8. The pierce nut installation apparatus as defined in claim 5, wherein said plunger is formed of steel including a planar end face having an axial threaded bore and said guide portion is threadably received in said threaded axial bore.

9. A pierce nut installation apparatus, comprising:
    a pierce nut feed passage receiving pierce nuts each having a threaded bore therethrough for installation by said pierce nut installation apparatus in a panel;
    a plunger passage communicating with said feed passage receiving pierce nuts from said feed passage; and
    a plunger reciprocating through said plunger passage having a generally planar end face engaging pierce nuts received in said plunger passage and installing said pierce nuts in a panel opposite said plunger passage, said planar end face having an axial bore and a generally cylindrical guide element releasably fixed in said axial bore of said plunger and projecting from said end face to be received in said threaded bore of said pierce nuts formed of a material softer than said pierce nuts including an outer diameter equal to or greater than an internal diameter of said threaded bore of said pierce nuts forming an interference fit with said threaded bore, said generally cylindrical guide element preventing cocking of said pierce nuts in said plunger passage and accurately locating said pierce nut on said panel.

10. The pierce nut installation apparatus as defined in claim 9, wherein said axial bore in said planar end face of said plunger is internally threaded and said generally cylindrical guide element having a male threaded end portion threadably received in said axial bore of said plunger.

11. The pierce nut installation apparatus as defined in claim 9, wherein said generally cylindrical guide element is frustoconical having a major diameter adjacent said planar end face of said plunger greater than said internal diameter of said threaded bore.

12. The pierce nut installation apparatus as defined in claim 11, wherein said generally cylindrical guide element is formed of a hard polymer.

13. The pierce nut installation apparatus as defined in claim 12, wherein said major diameter of said generally cylindrical guide element is greater than said internal diameter of said threaded bore of said pierce nuts.

14. The pierce nut installation apparatus as defined in claim 12, wherein said generally cylindrical guide element has a taper of between three and seven degrees.

15. A pierce nut installation apparatus, comprising:
    a pierce nut feed passage receiving pierce nuts each having a threaded bore therethrough for installation by said pierce nut installation apparatus in a panel;
    a plunger passage communicating with said feed passage receiving pierce nuts from said feed passage; and
    a plunger reciprocating through said plunger passage having a planar end face engaging pierce nuts received in said plunger passage and installing said pierce nuts in a panel opposite said plunger passage, said planar end face of said plunger including an axially extending frustoconical guide portion releasably fixed to said planar end face of said plunger and formed of a material softer than said pierce nuts having a major diameter adjacent said planar end face equal to or greater than an internal diameter of said threaded bore through said pierce nuts, said axially extending frustoconical guide portion received in said threaded bore of said pierce nuts during installation of a pierce nut by said plunger preventing cocking of said pierce nut in said plunger passage and accurately locating said pierce nut on said panel.

16. The pierce nut installation apparatus as defined in claim 15, wherein said planar end face of said plunger includes an axial threaded bore and said axially extending frustoconical guide portion includes a male threaded portion threadably received in said axial threaded bore.

17. The pierce nut installation apparatus as defined in claim 15, wherein said axially extending frustoconical guide portion is formed of a hard polymer.

* * * * *

UNITED STATES PATENT AND TRADEMARK OFFICE
CERTIFICATE OF CORRECTION

PATENT NO. : 6,912,776 B2
DATED : July 5, 2005
INVENTOR(S) : John J. Vrana

It is certified that error appears in the above-identified patent and that said Letters Patent is hereby corrected as shown below:

<u>Column 5,</u>
Line 45, please delete the word "is" before the word "frustoconical.".

Signed and Sealed this

Fourth Day of October, 2005

JON W. DUDAS
*Director of the United States Patent and Trademark Office*